United States Patent [19]
Knapp-Hayes

[11] Patent Number: 5,523,113
[45] Date of Patent: Jun. 4, 1996

[54] SYNTHETIC RESIN SHEET COMPRISING A CONDUCTIVE CARBON BLACK-CONTAINING COATING LAYER

[75] Inventor: Stephen J. Knapp-Hayes, Rijsbergen, Netherlands

[73] Assignee: General Electric Company, Pittsfield, Mass.

[21] Appl. No.: 287,688

[22] Filed: Aug. 9, 1994

[30] Foreign Application Priority Data

Sep. 9, 1993 [NL] Netherlands ............... 9301559

[51] Int. Cl.$^6$ ........................................ B05D 5/12
[52] U.S. Cl. ........................................ 427/58; 427/393.5
[58] Field of Search ................... 427/393.5, 58

[56] References Cited

U.S. PATENT DOCUMENTS

| | | | |
|---|---|---|---|
| 4,705,646 | 11/1987 | DuPont et al. | 252/511 |
| 4,714,569 | 12/1987 | Nishino et al. | 252/511 |
| 5,282,887 | 1/1994 | Gay et al. | 106/261 |

OTHER PUBLICATIONS

Abstract of JP 02-263873, Oct. 1990.
Abstract of JP 01-284564, Nov. 1989.
Abstract of JP 55-152756, Nov. 1980.
Abstract of JP 58-167658, Oct. 1983.

*Primary Examiner*—Shrive Beck
*Assistant Examiner*—Erma Cameron

[57] ABSTRACT

The invention relates to a synthetic resin sheet manufactured from a first thermoplastic synthetic resin comprising a coating layer from a thermoplastic synthetic resin composition, comprising a second thermoplastic synthetic resin, a polyacrylate with free, reactive hydroxyl groups and—per 100 parts by weight of the second thermoplastic synthetic resin—from 1 to 6% by weight of electrically conductive carbon black. The side of the synthetic resin sheet on which the coating layer has been provided, has an accurate and reproducibly adjustable surface resistivity from 100,000 to 100,000,000,000 Ohms per square. The synthetic resin sheet together with the coating layer provided thereon may be formed to articles by means of thermoforming. The surface resistivity remains substantially unchanged by the thermoforming.

8 Claims, No Drawings

SYNTHETIC RESIN SHEET COMPRISING A CONDUCTIVE CARBON BLACK-CONTAINING COATING LAYER

This invention relates to a synthetic resin sheet manufactured from a first thermoplastic synthetic resin and comprising at least one coating layer of a thermoplastic synthetic resin composition which comprises a second thermoplastic synthetic resin, a polyacrylate with free reactive hydroxyl groups and—per 100 parts by weight of the second thermoplastic synthetic resin—1 to 6 parts by weight of electrically conductive carbon black.

The invention also relates to a method of manufacturing the synthetic resin sheet according to the invention in which a lacquer system consisting of one more solvents and a thermoplastic synthetic resin composition which comprises a second thermoplastic synthetic resin, a polyacrylate having free, reactive hydroxyl groups and—per 100 parts by weight of the second thermoplastic synthetic resin—1 to 6 parts by weight of electrically conductive carbon black, is provided on at least one side of the synthetic resin sheet and is then dried.

The invention further relates to the lacquer system itself used and articles obtained from the synthetic resin sheet according to the invention by thermoforming.

Synthetic resin sheets manufactured from thermoplastic synthetic resins are generally known. They are manufactured and used on a large scale. In many applications, articles are formed from the synthetic resin sheets by further processing methods. Synthetic resin sheets manufactured from thermoplastic synthetic resins are particularly suitable to obtain therefrom articles by thermoforming. In the thermoforming process the synthetic resin sheet is heated, usually to a temperature above the glass transition temperature of the synthetic resin from which the sheet has been manufactured, and is then deformed. The forces required for the deformation can be obtained by using a vacuum; in that case there is sometimes referred to vacuum forming.

The properties of synthetic resin sheets may be varied by varying the nature of the synthetic resin from which the sheet has been manufactured or by manufacturing the sheet from synthetic resin compositions which consist of synthetic resins and additives. Another possibility—particularly when certain surface properties are desired—is to provide the synthetic resin with a coating layer having certain properties. It is then often preferred to provide a coating layer which is also built up from a thermoplastic material. When the coating layer consists of a thermoplastic material it is in general well possible first to provide the coating layer on the synthetic resin sheet, after which the synthetic resin sheet is processed by thermoforming. Such coating layers may be provided in various manners, for example, by coextrusion of thermoplastic compositions or by providing lacquer systems.

It is well known that most synthetic resins are poor conductors and in general have dielectric properties. More or less conductive properties can be obtained by the addition of conductive substances, for example, electrically conductive carbon black. It is also known to confer electrical properties on articles manufactured from synthetic resins by providing conductive coating layers on the surface of the formed articles. It is also possible to use electrically conductive carbon black in the coating layer.

When electrically conductive carbon black is used, either in the synthetic resin from which the sheet has been manufactured, or in the coating layer provided on the synthetic resin articles, an important problem occurs. It is more and more required in the electronic industry that the materials used and the articles formed therefrom have a surface resistivity which on the one hand lies in a certain range and on the other hand does not fluctuate too strongly for each individual article. The use of electrically conductive carbon black in synthetic resin masses leads to the occurrence of a phenomenon which is referred to as percolation. This phenomenon involves that the surface resistivity of articles formed from synthetic resins which comprise an electrically conductive carbon black or of articles which comprise a coating layer having an electrically conductive carbon black, in a rather narrowly restricted concentration range varies very considerably with a small variation in concentration of the carbon black. This makes it difficult to obtain accurately a certain surface resistance in a reproducible manner. This large variation in surface resistivity with a small variation in concentration of carbon black occurs just in the range which is of importance for the electronics industry. It relates to the range from 100,000 to 100,000,000,000 Ohms per square. In that range the surface resistance depends considerably not only on the concentration of carbon black but in addition also on the particle size and the dispersion of the carbon black particles in the synthetic resin.

This means that it is substantially impossible in practice to reproducibly manufacture synthetic resin sheets having a given surface resistivity when the sheet is manufactured by extrusion from a synthetic resin comprising carbon black as a conductive material. This is also difficult when a coating layer is used which is provided by extrusion. These problems are suspected to occur because in the extrusion or the coextrusion the dispersion of the carbon black particles is influenced uncontrollably.

A dispersion from a thermohardening synthetic resin in which electrically conductive carbon black has been dispersed is disclosed in US-A-4,705,646. This known dispersion may be provided on a substrate, after which a surface resistivity of approximately 600,000 Ohms per square is obtained. However, this thermohardening dispersion is unfit for use as a coating layer for synthetic resin sheets from thermoplastic synthetic resins which, after providing the coating layer, have to be subjected to a thermoforming treatment. Nothing is known about the reproducibility of the surface resistance which can be obtained with the known dispersion.

The invention provides a synthetic resin sheet which has a coating layer comprising electrically conductive carbon black in such a concentration that the surface resistivity of the coating layer lies between 100,000 and 100,000,000,000 Ohms per square.

The coating layer in the synthetic resin sheet comprises polyacrylate having free, reactive hydroxyl groups. Due to the presence of the polyacrylate with free, reactive hydroxyl groups it is possible to always obtain approximately the same surface resistivity in the above-given range in a reproducible manner.

The synthetic resin sheet has been manufactured from a first thermoplastic synthetic resin. Suitable synthetic resins are aromatic polycarbonates, polyalkylene phthalates, for example, polybutylene terephthalate and polyethylene terephthalate, polyether esters, polyether imides, ABS-resins, polyamides, polystyrene, polyphenylene ethers and polymethyl methacrylates. Mixtures of one or more of the synthetic resins mentioned hereinbefore are also suitable.

The synthetic resin sheet may be manufactured in various manners, for example, by extrusion. The sheet according to the invention generally has a thickness from 0.05 to 15 millimetres.

The synthetic resin sheet according to the invention comprises a coating layer. The coating layer consists of a thermoplastic synthetic resin composition which comprises a second thermoplastic synthetic resin, a polyacrylate having free, reactive hydroxyl groups and—per 100 parts by weight of the second thermoplastic synthetic resin—1 to 6 parts by weight of electrically conductive carbon black.

The second thermoplastic synthetic resin may be selected from the same thermoplastic synthetic resins as mentioned hereinbefore for the manufacture of the synthetic resin sheet. The first and the second synthetic resins may be identical or different.

The coating layer preferably has a thickness of at least 2 micrometres, more preferably a thickness of from 5 to 200 micrometres.

The concentration of conductive carbon black is selected dependent on the desired surface resistivity.

The synthetic resin composition from which the coating layer has been manufactured comprises a polyacrylate having free, reactive hydroxyl groups. Polyacrylates having free, reactive hydroxyl groups are generally known as a raw material for polyurethane lacquers.

They consist of copolymers of (1) acrylic acid and/or methacrylic acid and (2) hydroxy alkyl acrylate and/or hydroxy alkyl methacrylate. The copolymers may comprise further monomers, for example, styrene. Suitable hydroxy alkyl acrylates and/or hydroxy alkyl methacrylates are 2-hydroxy ethyl methacrylate and 2-hydroxy ethyl acrylate.

The polyacrylate having free, reactive hydroxyl groups seems to ensure that the distribution of the electrically conductive carbon black is not disturbed in providing the coating layer.

The concentration of polyacrylate having free, reactive hydroxyl groups in the thermoplastic synthetic resin composition from which the coating layer is built up, is from 50 to 5,000 parts by weight, preferably from 200 to 2,000 parts by weight per 100 parts by weight of electrically conductive carbon black.

The coating layer may be provided on the synthetic resin sheet in various manners. The coating layer is preferably provided in the form of a lacquer system consisting of one or more solvents and a thermoplastic synthetic resin composition comprising a second thermoplastic synthetic resin, a polyacrylate having free, reactive hydroxyl groups, and—per 100 parts by weight of the second thermoplastic synthetic resin—from 1 to 6 parts by weight of electrically conductive carbon black. After providing the lacquer layer it is dried.

The lacquer layer may be provided in various manners: by dip coating, spraying, by means of a roller, etc.

The synthetic resin sheet according to the invention may be deformed to three dimensional articles by means of thermoforming, the surface resistance being not or hardly varied.

EXAMPLE

Preparation of the Lacquer

A pigment concentrate was prepared consisting of:

3.20% by weight of electrically conductive carbon black having a particle size of more than 100 micrometres.

6.70% by weight of a polymethyl methacrylate having a low molecular weight;

89.30% by weight of propylene glycol mono methyl ether;

0.80% by weight of a commercially available wetting agent.

The above-mentioned constituents were ground in a ball mill until at least 85% by weight of the electrically conductive carbon black had a particle size from 25 to 40 micrometres.

The pigment concentrate was then mixed with the following constituents in the indicated quantities:

27.0% by weight of pigment concentrate;

31.0% by weight of a solution of 40% by weight of polymethyl methacrylate in methyl ethyl ketone. The polymethyl methacrylate in question had a higher molecular weight than the polymethyl methacrylate used for the preparation of the pigment concentrate.

12.3% by weight of a solution in xylene of 55% by weight of a terpolymer of a hydroxy alkyl acrylate, styrene and methacryl esters;

2.0% by weight of a flow-improving additive;

6.0% by weight of propylene glycol monomethyl ether acetate;

8.7% by weight of methyl ethyl ketone; and 13.0 by weight of propylene glycol mono methyl ether.

The pigment concentrate was further mixed in various concentrations with the remaining constituents of the lacquer system so as to prepare lacquer systems having various concentrations of carbon black.

In addition, three lacquer systems were prepared without the addition of the terpolymer with units derived from a hydroxy alkyl acrylate.

Providing the Lacquer System and Testing the Resulting Synthetic Resin Sheet

The lacquer systems thus obtained were provided on sheets of polycarbonate having a thickness of 3 millimetres by means of coating bar. The lacquer systems were provided in such a thickness that the coating layer, after drying, had a thickness of 10 micrometres.

In a first experiment, lacquer systems 1, 2 and 3, right after providing, i.e. within a few seconds, were placed in a hot-air furnace (temperature 80°–100° C.) and dried therein for approximately 10 minutes; in a second experiment the lacquered sheets were first stored in air for a few minutes before they were transferred to the furnace. Lacquer systems 4 through 10 were always stored in air for a few minutes before they were transferred to the furnace.

The surface resistivity of the synthetic resin sheets thus obtained was measured by means of a so-called Surface Resistivity Meter, Model TI 500, manufactured by Static Control Services, Palmsprings, Calif.

The materials used and the resulting properties are recorded in the following table.

TABLE

| | Lacquer system Number | | | | | | | | | |
|---|---|---|---|---|---|---|---|---|---|---|
| | 1 | 2 | 3 | 4 | 5 | 6 | 7 | 8 | 9 | 10 |
| Composition coating layer (wt. %) | | | | | | | | | | |
| polymethyl methacrylate | 89 | 95.5 | 68.5 | 67 | 67.3 | 67.6 | 68 | 68.3 | 68.5 | 68.8 |
| Carbon black | 11 | 4.5 | 3.5 | 6 | 5.4 | 4.7 | 4.3 | 3.9 | 3.6 | 3.2 |
| Poly acrylate with hydroxyl groups | 0.0 | 0.0 | 28 | 27 | 27.3 | 27.6 | 27.7 | 27.8 | 27.9 | 28 |
| Properties Surface resistivity (Ohms per square) | | | | | | | | | | |
| with direct drying | $10^3$ | $10^7$ | $10^7$ | n.d. | n.d. | n.d. | n.d. | n.d. | n.d. | n.d. |
| With drying after a few minutes | $10^3$ | $10^{14}$ | $10^7$ | $10^4$ | $10^5$ | $10^6$ | $10^7$ | $10^8$ | $10^{12}$ | $10^{14}$ | n.d. = not determined

The coating layers obtained with the lacquer systems 1 and 2 show the following picture. In the absence of a polyacrylate with free hydroxyl groups it is possible with a comparatively high concentration of carbon black (lacquer system 1) to obtain a reproducible value for the surface resistance. However, this value is outside the desired range. A surface resistivity inside the desired range can be obtained by using a lacquer system having a lower concentration of carbon black (lacquer system 2). In that case it is substantially impossible to obtain reproducible values: when the lacquered synthetic resin sheet is not immediately transferred to the furnace, a change of the surface resistivity occurs.

With lacquer system 3 (and with lacquer systems 4 through 10) according to the invention, the said instability does not occur.

The synthetic resin sheet according to the invention may be further treated by means of thermoforming. In order to make this readily possible it is to be preferred for the composition of the coating layer to be such as to have a glass transition temperature which is lower, for example, at least 10° C. lower, than the glass transition temperature of the synthetic resin from which the synthetic resin sheet has been manufactured.

I claim:

1. A method of coating a synthetic resin sheet comprising a first thermoplastic synthetic resin, wherein a lacquer system consisting of one or more solvents, a thermoplastic synthetic resin composition which comprises a second thermoplastic synthetic resin selected from aromatic polycarbonates, polyalkylene phthalates, polyether esters, polyether imides, ABS acrylonitrile-butadiene-styrene-resins, polyamides, polystrene, polyphenylene ethers, polymethyl methacrylates or mixtures thereof and a polyacrylate which is a copolymer comprising (1) acrylic acid or methacrylic acid and (2) hydroxy alkyl acrylate or hydroxy alkyl methacrylate and from 1 to 6 parts by weight per 100 parts by weight of the second thermoplastic synthetic resin of electrically conductive carbon black, is provided on at least one side of the synthetic resin sheet and is then dried.

2. The method as claimed in claim 1, wherein the lacquer system is provided in such a thickness that, after drying, it has a thickness of at least 2 micrometres.

3. The method as claimed in claim 1, wherein the second thermoplastic synthetic resin is a polymethyl methacrylate.

4. The method of claim 1 wherein the lacquer system is provided on the synthetic resin sheet by extrusion.

5. The method of claim 1 wherein the polyacrylate is present in the lacquer system in an amount of from 50 to 5000 parts by weight per 100 parts by weight of electrically conductive carbon black.

6. The method of claim 1 wherein the lacquer system is provided on the synthetic resin sheet by dip coating.

7. The method of claim 1 wherein the lacquer system is provided on the synthetic resin sheet by spraying.

8. The method of claim 1 wherein the lacquer system is provided on the synthetic resin sheet by roller coating.

* * * * *